US006199346B1

(12) United States Patent
Ahad et al.

(10) Patent No.: US 6,199,346 B1
(45) Date of Patent: Mar. 13, 2001

(54) APPARATUS FOR CONTINUOUS MANUFACTURE OF MULTI-COLORED AND/ OR MULTI-FLAVORED FOOD PRODUCT

(75) Inventors: Asma N. Ahad, Skokie; Warren R. Zaug, Niles; Kampat Sangern, Buffalo Grove; Gary F. Smith, Highland Park; Susan B. Findlay, Northfield, all of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/203,103

(22) Filed: Dec. 1, 1998

(51) Int. Cl.⁷ ..................................................... B65B 63/08
(52) U.S. Cl. ............................. 53/122; 53/154; 53/127; 426/517
(58) Field of Search ............................. 53/122, 127, 546, 53/202, 154, 237; 426/517

(56) References Cited

U.S. PATENT DOCUMENTS

| 692,323 | 2/1902 | Marine . | |
|---|---|---|---|
| 1,951,694 | 3/1934 | Goulstone | 226/100 |
| 2,774,314 | 12/1956 | Moser | 107/1 |
| 2,847,947 | 8/1958 | Pelletier | 107/54 |
| 3,147,717 | 9/1964 | Smith | 107/1 |
| 3,295,466 | 1/1967 | Bell et al. | 107/1 |
| 3,359,925 | 12/1967 | Porada | 107/1 |
| 3,479,024 | 11/1969 | Miller et al. | 270/58 |
| 3,647,478 | 3/1972 | Minor et al. | 99/137 |
| 3,887,719 | 6/1975 | Miller | 426/517 |
| 3,991,217 | 11/1976 | Kinney | 426/249 |
| 4,017,574 | 4/1977 | Joshi | 264/75 |
| 4,061,248 | 12/1977 | Arena | 222/4 |
| 4,112,131 | 9/1978 | Bosy et al. | 426/582 |
| 4,254,894 | 3/1981 | Fetters | 222/1 |
| 4,500,553 | 2/1985 | Liggett et al. | 426/101 |
| 4,504,511 | 3/1985 | Binley | 426/565 |
| 4,586,317 | 5/1986 | Bussell | 53/451 |
| 4,588,592 | 5/1986 | Elias | 426/5 |
| 4,630,426 | * 12/1986 | Gentry | 53/122 X |
| 4,666,723 | 5/1987 | Invernizzi et al. | 426/414 |
| 4,735,817 | 4/1988 | Smith | 426/517 |
| 4,792,457 | 12/1988 | Brna et al. | 426/574 |
| 4,873,104 | 10/1989 | Butcher et al. | 426/249 |
| 4,902,523 | 2/1990 | Fritchen et al. | 426/231 |
| 4,923,706 | 5/1990 | Binley et al. | 426/516 |
| 4,925,380 | 5/1990 | Meisner | 425/131.1 |
| 4,986,080 | 1/1991 | Grigoli et al. | 62/75 |
| 4,994,288 | 2/1991 | Graham, III et al. | 426/249 |

(List continued on next page.)

FOREIGN PATENT DOCUMENTS

| 883029 | 10/1971 | (CA) . |
| 2186175 | 8/1987 | (GB) . |
| 55-74757 | 5/1980 | (JP) . |

*Primary Examiner*—Linda Johnson
(74) *Attorney, Agent, or Firm*—Stephen G. Rudisill; Jenkens & Gilchrist

(57) ABSTRACT

A method and an apparatus for manufacturing a food product having a plurality of sections having different characteristics, such as different colors and/or flavors. The method and apparatus has a first nozzle extruding a first stream of a liquid food product having a first characteristic onto a moving platform. The first stream has a height and a width with respect to the platform. A second nozzle extrudes a second stream of a liquid food product having a second characteristic onto the platform. The second stream has a height and a width with respect to the platform. The second nozzle is adjacent to the first nozzle providing adjacent first and second streams on the moving platform. The first stream and second stream spread out such that their heights decrease and their widths increase. When the increasing width of the first stream abuts the increasing width of the second stream, the first stream has a first viscosity and the second stream has a second viscosity which inhibit substantial mixing of the first and second streams when the two streams abut.

40 Claims, 11 Drawing Sheets

U.S. PATENT DOCUMENTS

| | | | |
|---|---|---|---|
| 5,019,404 | 5/1991 | Meisner | 426/249 |
| 5,031,567 | 7/1991 | Daouse et al. | 118/15 |
| 5,205,106 * | 4/1993 | Zimmermann et al. | 53/122 X |
| 5,215,778 | 6/1993 | Davison et al. | 426/582 |
| 5,343,710 | 9/1994 | Cathenaut et al. | 62/71 |
| 5,356,648 | 10/1994 | Kortschot | 426/249 |
| 5,374,436 | 12/1994 | White et al. | 426/249 |
| 5,417,990 | 5/1995 | Soedjak et al. | 426/89 |
| 5,431,946 | 7/1995 | Vesely et al. | 416/582 |
| 5,435,143 | 7/1995 | Heinrich | 62/75 |
| 5,447,036 | 9/1995 | Heinrich | 62/75 |
| 5,470,595 | 11/1995 | Kopp et al. | 426/231 |
| 5,514,397 | 5/1996 | Shapiro | 426/249 |
| 5,582,856 | 12/1996 | White et al. | 426/249 |
| 5,603,965 | 2/1997 | Daouse | 425/130 |
| 5,634,324 * | 6/1997 | Schmachtel | 53/546 |
| 5,724,789 * | 3/1998 | Corella | 53/546 X |

* cited by examiner

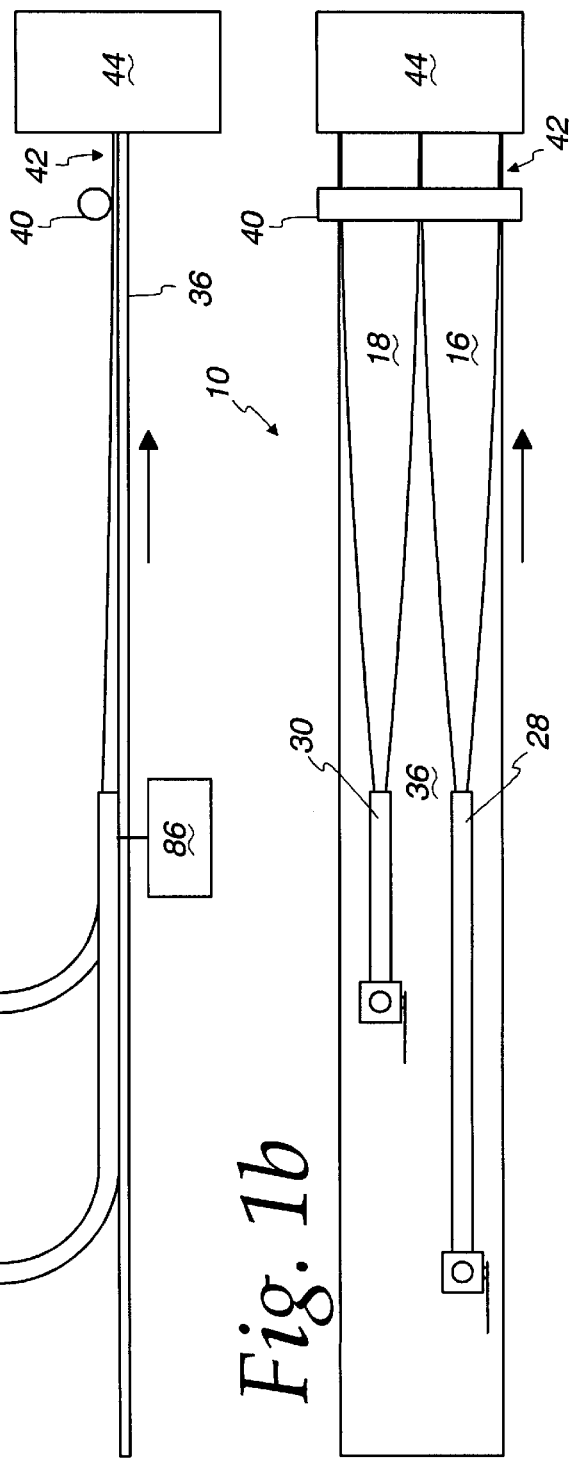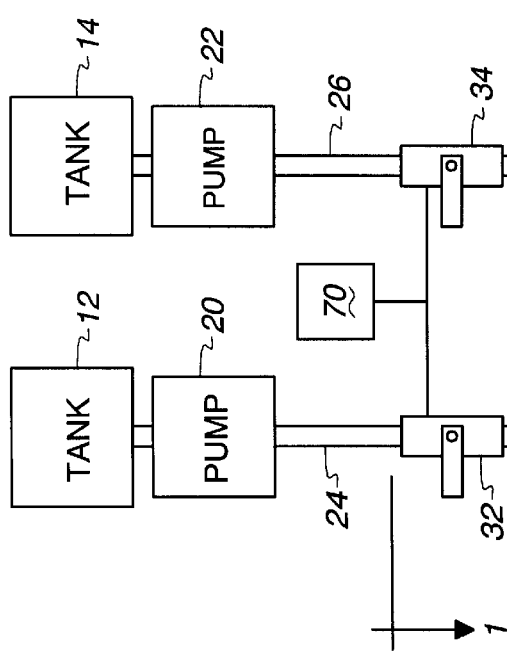

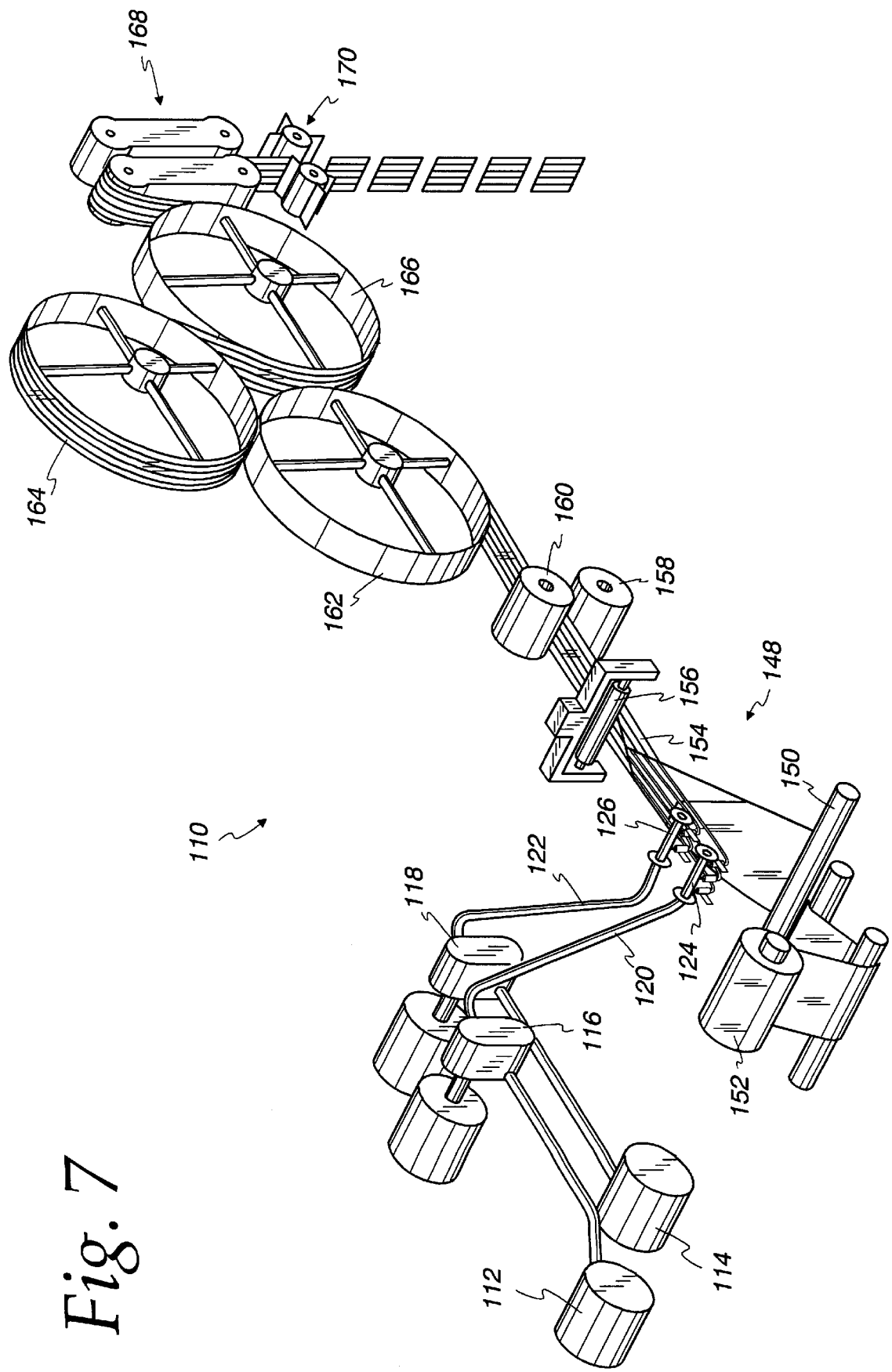

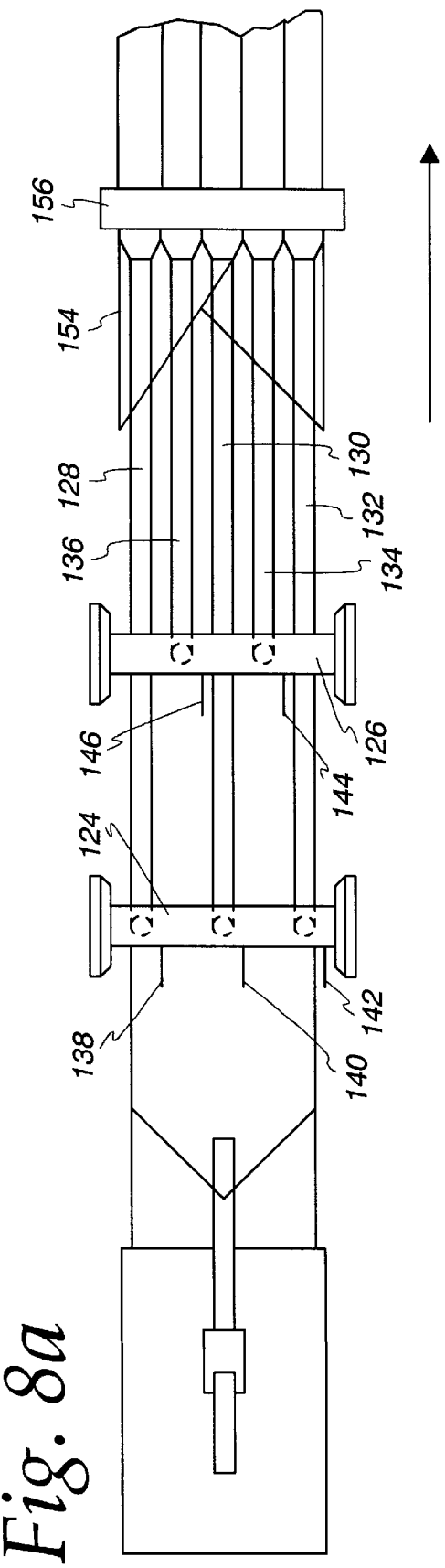
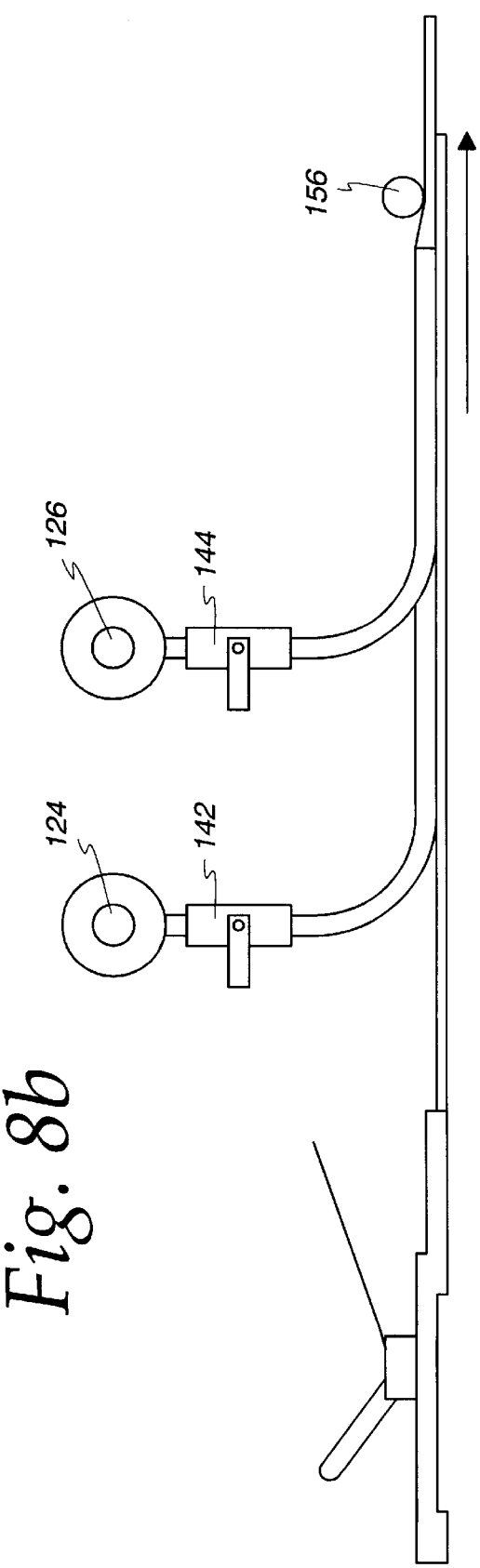
Fig. 8a
Fig. 8b

APPARATUS FOR CONTINUOUS MANUFACTURE OF MULTI-COLORED AND/OR MULTI-FLAVORED FOOD PRODUCT

BACKGROUND OF THE INVENTION

1. Field of the Invention

The present invention relates generally to the continuous manufacture of a food product and, more particularly, to the continuous manufacture of a multi-colored and multi-flavored food product.

2. Description of the Related Art

Consumers, especially children, enjoy food products with colorful and attractive design patterns. For instance, some ice cream novelties and popsicles have decorative patterns consisting of layers or regions of different color and/or flavors. To maintain the desired multi-color and/or multi-flavored pattern, the colors and/or flavors must remain separate with minimal mixing or blending.

To supply the consumer desire for multi-colored and/or multi-flavored food products, the food products industry has developed methods for manufacturing these food products. One conventional method of manufacturing multi-colored and/or multi-flavored food products consists of joining two or more layers of solid material. For example, some multi-colored and/or multi-flavored ice cream confections and popsicles are manufactured by filling separate molds with various liquid or semi-solid colored ice creams or ices. By freezing the molds, the ice creams or ices solidify within their molds. Removing these solids from their molds and joining them together creates the multi-colored and/or multi-flavored food product.

Another conventional method for manufacturing multi-colored and/or multi-flavored food products consists of joining two or more layers of semi-solid materials. For example, some multi-colored and/or multi-flavored ice cream confections are manufactured by extruding streams of differently colored or flavored ice creams in their plastic, semi-solid or semi-frozen state from nozzles. When the ice creams in their semi-solid state contact, they do not mix or run together but remain as distinct layers. Additional multi-colored and/or multi-flavored food products manufactured by joining semi-solid materials are multi-colored and multi-flavored chewing gum and aerated confections. The conventional method for manufacturing chewing gum and aerated confections consists of extruding strands or ropes of semi-solid material from nozzles. The individual strands or ropes are then joined together without mixing of the colors and/or flavors.

Another multi-colored or multi-flavored food product with distinct regions of color and/or flavor is variegated or ripple ice cream. The conventional method of manufacturing variegated ice cream blends fluid chocolate into semi-frozen ice cream. When the fluid chocolate contacts the semi-frozen ice cream, the fluid chocolate hardens preventing mixing of the colors and/or flavors.

Another manufacturing method producing multi-colored and/or multi-flavored food products uses special colorants that do not mix or run together. For example, special water-soluble colorants and complexing agents produce multi-colored and multi-layer gelled products, such as gelatin desserts. To provide the distinct patterns, the complexing agents prevent the colorants from migrating within the gelled layer.

Cheese is a food product where physical appearance plays an important part in its consumer acceptability. Multi-colored cheese with an attractive design pattern especially appeals to children. One conventional method of manufacturing multi-colored and/or multi-flavored cheese is to combine two solid cheeses. For example, a star-shaped portion of two differently colored cheese wheels is removed from their respective cheese wheel and substituted into the center of the other cheese wheel. The resulting multi-colored cheese wheels have a star-shaped center of a different color cheese. The main problem with this method is that it is slow, labor intensive and costly.

Another contemporary method of manufacturing multi-colored and/or multi-flavored cheese combines two differently colored and/or flavored, semi-solid cheese curds. The resulting cheese product has a variegated, mottled appearance. The main problem with this method is that the variegated cheese has random blended colors that are not in a distinct pattern or design. Additionally, after the semi-solid cheese curds are mixed, the cheese must be shaped, solidified and packaged.

Individual process cheese slices are a cheese product which appeal to consumers, especially children. However, contemporary apparatus for manufacturing individual process cheese slices produces cheese slices of a single color and/or flavor. One conventional apparatus for manufacturing single color and/or single flavor cheese slices is the hot pack single-slice packaging apparatus. In the hot pack apparatus, an extrusion nozzle discharges molten cheese into a film tube. The film tube moves away from the nozzle at a steady rate to allow the film tube to fill with the cheese product. Sizing rolls flatten the longitudinally sealed film tube and the molten cheese product to a desired product thickness. To solidify the cheese, the cheese-filled film tube moves over cooling wheels that cool the cheese. To produce the individual cheese slices, the cooled cheese tube is transversely cut and sealed. One disadvantage of the contemporary hot pack apparatus is that it only produces cheese slices of a single color and/or flavor.

Another contemporary apparatus for manufacturing individual cheese slices of a single color and/or single flavor is the chill roll single-slice apparatus. In the chill roll apparatus, molten cheese fills a hopper to a desired level. The molten cheese then flows out of the hopper onto a large, chilled, cylindrical roll. A sizing roll flattens the cheese product on the chill roll into a cheese sheet with a desired product thickness. The chill roll cools the continuous sheet of warm cheese as it moves along with the rotating roll. Once the cheese sheet has solidified, it is removed from the chill roll and slit to form continuous ribbons. A cutting assembly transversely cut the ribbons of cheese into individual cheese slices which are then stacked and wrapped in packaging for sale to consumers. One shortcoming of the contemporary chill roll apparatus is that it only produces cheese slices of a single color and/or flavor.

Thus, a need has arisen for a new method and apparatus for manufacturing of a multi-colored and/or multi-flavored food product, especially cheese slices, which will efficiently provide the food product with a distinct pattern or design while preventing the colors or flavors from substantially mixing.

SUMMARY OF THE INVENTION

In accordance with one aspect of the present invention, there is provided a method and apparatus for manufacturing a food product having a plurality of sections having different characteristics, such as different colors and/or flavors. The method and apparatus has a first nozzle extruding a first stream of a liquid food product having a first characteristic onto a moving platform. The first stream has a height and a width with respect to the platform. A second nozzle extrudes a second stream of a liquid food product having a second characteristic onto the platform. The second stream has a height and a width with respect to the platform. The second nozzle is adjacent to the first nozzle providing adjacent first and second streams on the moving platform. The first stream and second stream spread out such that their heights decrease and their widths increase. When the increasing width of the first stream abuts the increasing width of the second stream, the first stream has a first viscosity and the second stream has a second viscosity which inhibit substantial mixing of the first and second streams. A cooling means may also be provided to cool the first stream and the second stream to provide the first viscosity and the second viscosity that inhibit substantial mixing of the first stream with the second stream when the two streams abut.

In accordance with another aspect of the present invention, there is provided an improved hot pack cheese slice apparatus for manufacturing cheese slices having a plurality of sections having different characteristics, such as different colors and/or flavors. The hot pack apparatus has a film dispensing station that forms a tube of packaging film and a series of cooling wheels that pull the tube in a longitudinal direction. The improvement comprises a first nozzle extruding a first stream of a liquid food product having a first characteristic into the tube. A second nozzle extrudes a second stream of a liquid food product having a second characteristic into the tube. The second nozzle is adjacent to the first nozzle providing adjacent first and second streams in the tube. The first stream and the second stream spread out in a lateral direction within the tube. When the lateral spread of the first stream abuts the lateral spread of the second stream, the first stream has a first viscosity and the second stream has a second viscosity which inhibit substantial mixing of the first and second streams. A cooling means may also be provided to cool the first stream and the second stream to provide the first viscosity and the second viscosity that inhibit substantial mixing of the first stream with the second stream when the two streams meet.

In accordance with a further aspect of the present invention, there is provided an improved chill roll apparatus for manufacturing cheese slices having a plurality of sections having different characteristics, such as different colors and/or flavors. The chill roll apparatus has a large, rotating cylindrical roll. The improvement comprises a first nozzle extruding a first stream of a liquid food product having a first characteristic onto the roll. A second nozzle extrudes a second stream of a liquid food product having a second characteristic onto the roll. The second nozzle is adjacent to the first nozzle providing adjacent first and second streams on the roll. The first stream and second streams have a height and width with respect to the roll. The streams spread out on the roll such that their height decreases and their width increases. When the increasing width of the first stream abuts the increasing width of the second stream, the first stream has a first viscosity and the second stream has a second viscosity which inhibit substantial mixing of the first and second streams. A cooling means may also be provided to cool the first stream and the second stream to provide the first viscosity and the second viscosity that inhibit substantial mixing of the first stream with the second stream when the two streams meet.

BRIEF DESCRIPTION OF THE DRAWINGS

The foregoing and other advantages of the invention will become apparent upon reading the following detailed description and upon reference to the drawings which:

FIG. 1a is a front view process diagram of a multicolor and/or multi-flavored food product apparatus of the present invention;

FIG. 1b is a top view of the multi-colored and/or multi-flavored food product apparatus illustrated in FIG. 1a along the line 1—1;

FIG. 2 is an isometric view of a food product produced by the multi-colored and/or multi-flavored food product apparatus of FIG. 1a;

FIG. 4 is an isometric view of an alternative embodiment of a food product produced by the multi-colored and multi-flavored food product apparatus of FIG. 1a;

FIG. 6 is an isometric view of an alternative embodiment of a food product produced by the multi-colored and multi-flavored food product apparatus of FIG. 1a;

FIG. 7 is an isometric view of a hot pack single slice cheese apparatus incorporating the multi-colored and/or multi-flavored food product apparatus of the present invention;

FIG. 8a is a top view of the multi-colored and/or multi-flavored food product apparatus of FIG. 7;

FIG. 8b is a front view of the multi-colored and/or multi-flavored food product apparatus of FIG. 7;

Figure 2:
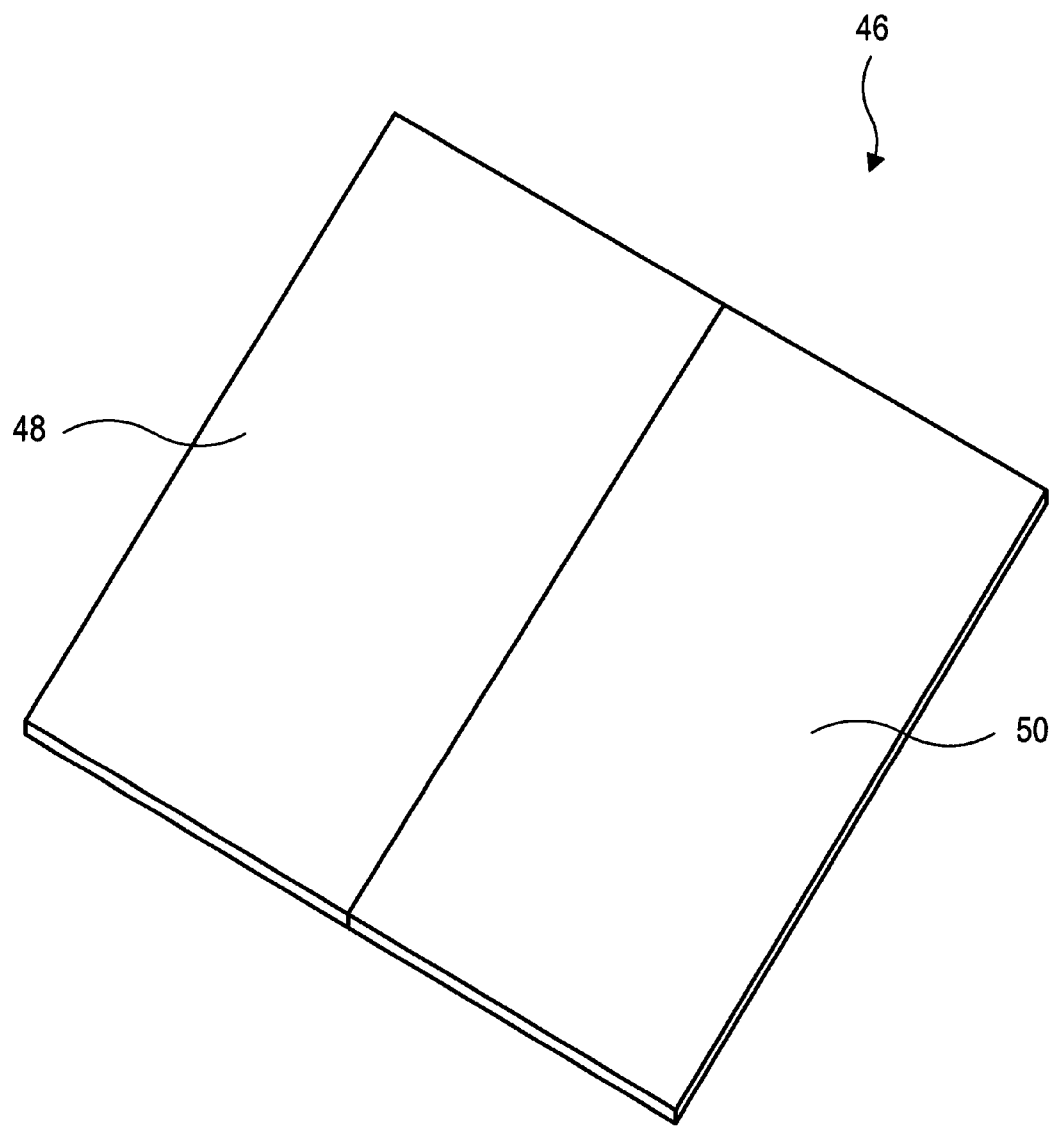

While the invention is susceptive to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE INVENTION

Surprisingly, it has been discovered that a multi-colored and/or a multi-flavored food product can be efficiently made with a method and apparatus in accordance with the present invention. The method and apparatus of the present invention has been found to efficiently, continuously manufacture a multi-colored and/or multi-flavored food product by extruding liquid streams of a plurality of different colored and/or flavored food products onto a moving platform. Furthermore, the method and apparatus of the present invention produces a food product with multiple colors and/or flavors in distinct regions without substantial mixing the colors and/or flavors.

FIGS. 1a & 1b illustrate the method and apparatus 10 for manufacturing the multi-colored and/or multi-flavored food product of the present invention. A first storage tank 12 holds a molten first food product 16 having one color and/or flavor. A second storage tank 14 holds a molten second food product 18 having different color and/or flavor. To allow the first and second food products to flow through the apparatus 10, the viscosity of the first and second food products is less than or equal to a maximum pumpable viscosity. A metering pump 20 communicates the first food product through a tube 24, and another metering pump 22 communicates the second food product through another tube 26. A nozzle 28 extrudes a stream of the liquid first food product 16 onto a moving platform 36. A nozzle 30 extrudes a stream of the liquid second food product 18 onto the platform 36 adjacent to the first stream 16.

The platform 36 moves at a constant speed away from the extrusion nozzles 28 and 30. The moving platform 36 allows the continuous first liquid stream 16 and the continuous second liquid stream 18 to flow out of the nozzles 28 and 30 respectively without substantial build up on the platform 36. As depicted in FIGS. 1a and 1b, the direction of flow of the first liquid stream 16 and second liquid stream 18 from the nozzles 28 and 30 is in the same direction as the movement of the platform 36; however, the direction of flow may also be in the opposite direction as the movement of the platform 36. The platform 36 may be a web of packaging, a chill roll, a moving non-stick belt, or any other platform known to one of ordinary skill in the art.

In order to extrude the first and second liquid food products 16 and 18 as separate streams, the second nozzle 30 is adjacent the first nozzle 28. The nozzles 28 and 30 extrude the streams 16 and 18 onto the moving platform 36. The extruded streams 16 and 18 have a height and a width with respect to the platform. Once the streams contact the moving platform 36, they move longitudinally away from the nozzles 28 and 30 with the moving platform 36 in the direction of the arrow. As the streams 16 and 18 move longitudinally with the platform 36, the streams 16 and 18 spread out laterally on the platform 36 due to the force of gravity such that the width of each stream increases while the height of each stream decreases.

Once the streams 16 and 18 are extruded from their respective nozzles 28 and 30, a cooling means 38 reduces the temperature of the first and second liquid food products 16 and 18 increasing the viscosity of each stream. Any type of cooling means know to one of ordinary skill in the art may be used to cool the streams 16 and 18, including cooling plates, cooling rolls, cooling wheels, cold air spray, brine or ambient cooling.

The cooling means 38, such as ambient cooling wherein the air surrounding the streams has a lower temperature than the streams, reduces the temperature of the first and second streams 16 and 18. As the streams 16 & 18 cool, a "skin" forms on their surfaces with increased surface tension and viscosity around the circumference of the liquid streams 16 and 18. Because the streams 16 and 18 have cooled and their surface tensions and viscosities have increased, when the lateral spreading of the first stream 16 abuts the lateral spreading of the second stream 18, the two streams of different color and/or flavor do not substantially mix. Alternatively, when the two streams 16 and 18 are extruded from their nozzles, the streams may already have viscosities without cooling that inhibit substantial mixing of the streams when their lateral spreadings meet.

For continuous operation of the method and apparatus 10 to produce the multi-colored and/or multi-flavored food product, the viscosity of the first and second streams 16 and 18 may vary within apparatus. When the first and second streams 16 and 18 are within the tubes 24 and 26, the viscosities of the first and second streams may be less than or equal to a maximum pumpable viscosity. The maximum pumpable viscosity is a viscosity that allows a continuous stream of food product to pass through the tubes 24 and 26 and out of the nozzles 28 and 30. When the lateral spread of the first stream abuts the lateral spread of the second stream, the viscosities of the first and second streams 16 and 18 may be greater than or equal to a minimum inhibit substantial mixing viscosity. The minimum inhibit substantial mixing viscosity is a viscosity that inhibits the lateral spread of the first stream from substantially mixing with the lateral spread of the second stream when the streams meet to form a single stream.

After the two streams abut, they join into the single stream and continue moving away from the nozzles 28 and 30 with the platform 36. The cooling means 38 or a separate cooling means further cools the single stream into a solid food product with two regions of distinct color and/or flavor.

To ensure the two streams 16 and 18, a join into a single food product 42, a stream joiner may be added to the apparatus 10. In the embodiment illustrated in FIGS. 1a and 1b, the stream joiner is a sizing roll 40; however, other ways to join the two streams 16 and 18 into a single food product stream 42 may be used including air pressure and a compression plate. The stream joiner ensures that the two streams 16 and 18 unify into a single stream 42 if they had not previously merged. In addition to ensuring the two streams 16 and 18 join into a single food product stream, a flattener may be added to the apparatus 10 to flatten the food product to a desired uniform thickness or height. In the embodiment illustrated in FIGS. 1a and 1b, the flattener is a sizing roll 40; however, other ways to flatten the food product stream into the uniform thickness may be used including air pressure and a compression plate. In the illustrated embodiment, the stream joiner and the flattener are united into a single sizing roll 40. In other embodiments, the stream joiner may function to join the two streams 16 and 18 into a single stream 42, and then after the single stream 42 has further cooled, a flattener may compress the food product stream 42 to the uniform thickness.

Once the unified stream 42 of food product has solidified, the platform 36 delivers the product 42 to a cutting and packaging apparatus 44. The cutting and packaging apparatus 44 partitions the food product 42 into appropriate lengths and packages it for sale to consumers. The cutting and packaging apparatus 44 may be any of the type known to one of ordinary skill in the art.

FIG. 2 illustrates a multi-colored and/or multi-flavored solid food product 46 produced by the apparatus 10 of the present invention. The first food product 16 of the first stream remains in a distinct region or band 48 and the second food product 18 of the second stream remains in a distinct band 50. The two distinct regions of first food product 16 and second food product 18 provide a distinct striped pattern and design.

Figure 3:
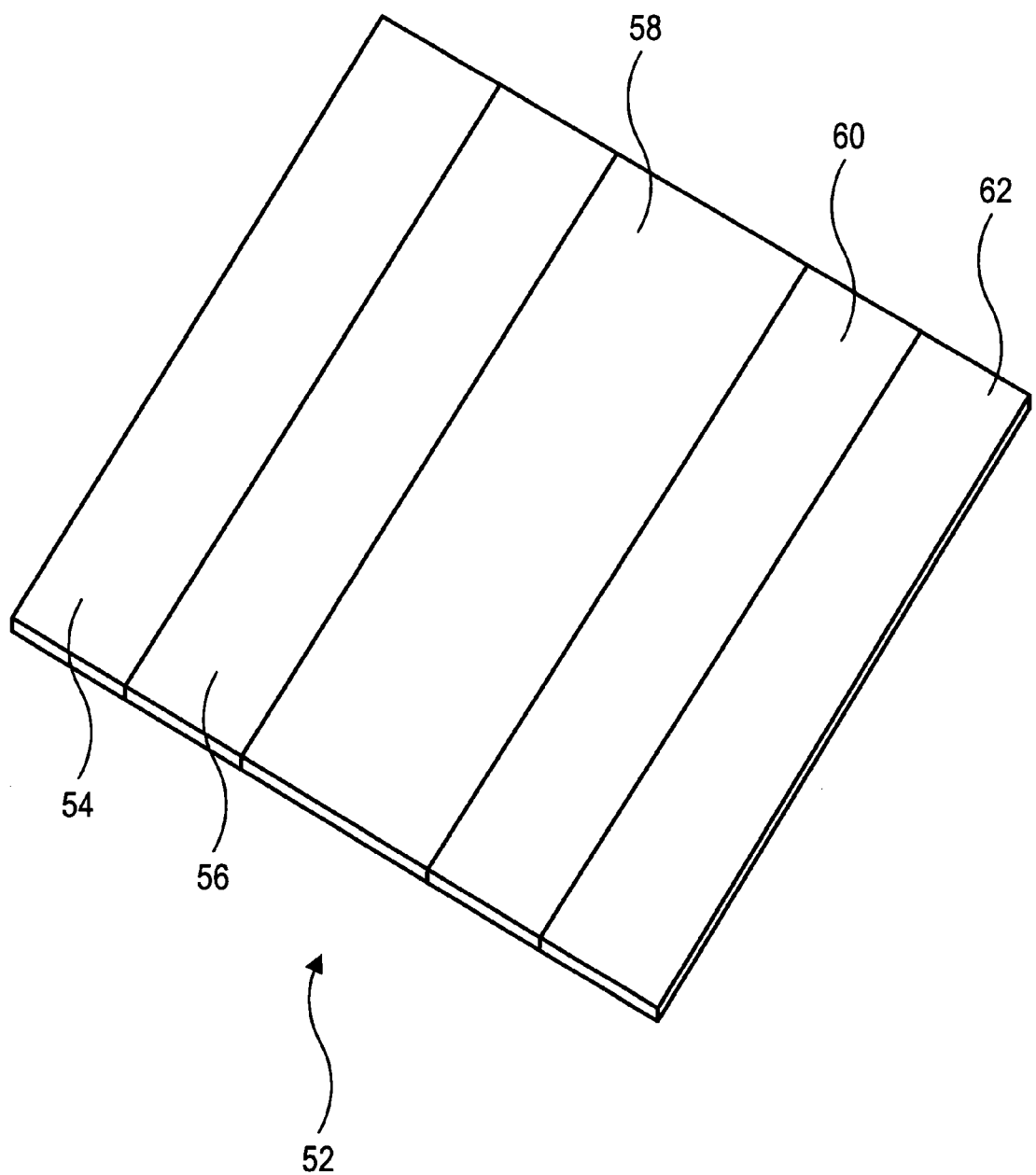
FIG. 3 is an isometric view of a food product produced by an alternative embodiment of the multi-colored and/or multi-flavored food product apparatus.

A variety of patterns for the final food product may be produced with the apparatus 10 and method of the present invention. FIG. 3 illustrates another pattern and design for the food product 52 with five distinct regions 54, 56, 58, 60 and 62 of different color and/or flavor. Modifications to the apparatus 10 illustrated in FIGS. 1a and 1b produce the food product illustrated in FIG. 3. By adding three additional storage tanks, pumps, tubes, valves and nozzles to the apparatus 10, five nozzles extrude five streams onto the moving platform. These five adjacent streams of different color and/or flavor food product cool, join and solidify similarly as the two streams as described above. Additionally, a striped pattern alternating bands of color and/or flavor may be produced by alternating the color and/or flavor of the extruded streams. A large variety of striped food products may be produced using the apparatus 10 of the present invention.

Figure 4:
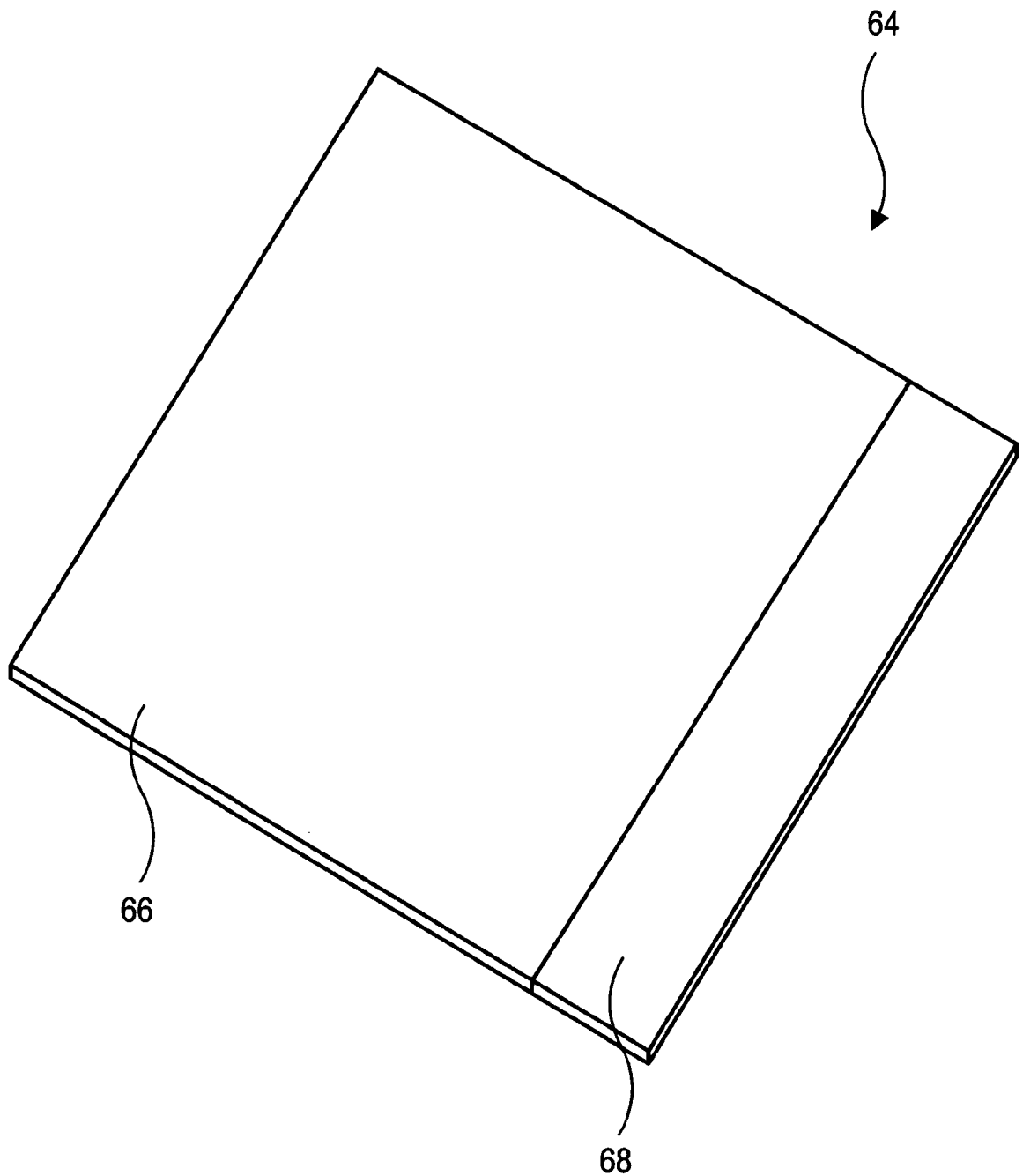

The pattern for the final food product not only depends on the number of nozzles extruding streams of different color and/or flavor food products as described above but also on the flow rate of the extruded streams. The volume of the extruded stream determines the width of the band of color and/or flavor of the final food product. To control the flow rates of the extruded streams, the tubes 24 and 26 have valves 32 and 34. By adjusting valve 32 to decrease the flow rate, a lesser volume of the first food product 16 flows out of nozzle 28, and by adjusting valve 34 to increase the flow, a greater volume of the second food product 18 flows out of nozzle 30. The extruded streams cool, join and solidify in the similar manner as described above. Because the first stream has a lesser volume than the second stream, the second stream spreads out further laterally than the first stream producing a wider band of the second color and/or flavor and a thinner band of the first color and/or flavor. FIG. 4 illustrates a food product 64 produced with a wide band 66 of the second food product and a narrow band 68 of the first food product. By adjusting the valves 32 and 34, the flow rate of the streams may be increased or decreased providing wider and thinner banded patterns, respectively.

To control the flow rates of the streams from the nozzles, an operator may manually adjust the valves 32 and 34 or an automatic controller 70 may adjust the valves. The controller 70 may be of any type known to one of ordinary skill in the art. Additionally, the controller 70 may sense and control the operations of all of the components of the apparatus 10 including the meter pumps 20 and 22 and the rate of platform 36 motion. By controlling the flow rates of the streams, the controller 70 controls the width of the colored and/or flavored bands of the final food product and thus controls the pattern for the final food product.

Figure 5A:
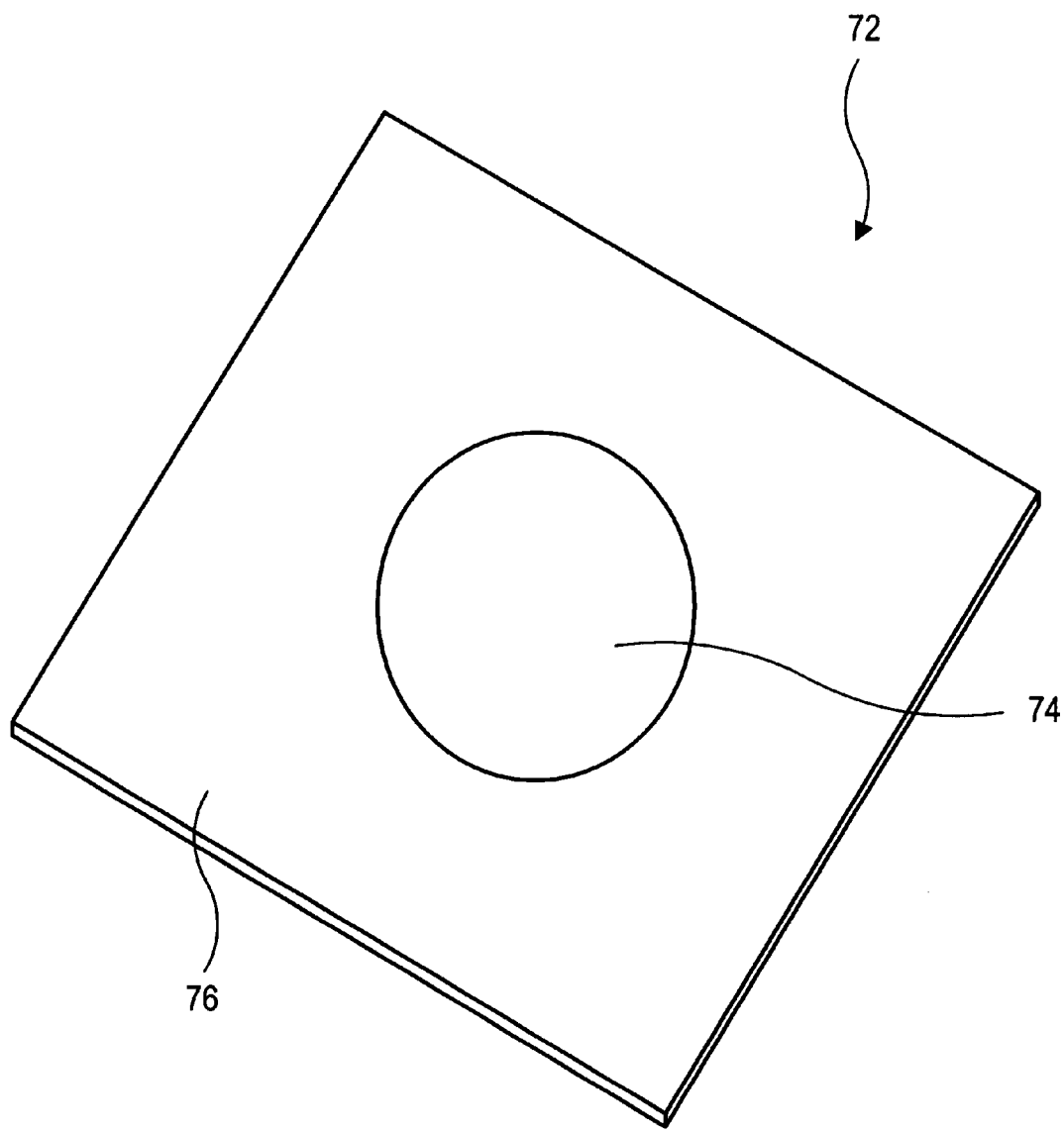
FIG. 5a is an isometric view of a food product produced by an alternative embodiment of the multi-colored and multi-flavored food product apparatus.

For example, dynamic valve adjustments provided by the controller 70 produce the final food product 72 illustrated in FIG. 5a with a circle 74 of one color and/or flavor surrounded by another color and/or flavor 76. To produce the final food product 72 illustrated in FIG. 5a, two nozzles extruding a first color and/or flavor stream 76 surround a single nozzle extruding a second color and/or flavor stream 74. The controller 70 opens and closes the valve of the second color and/or flavor stream 74 in tandem with narrowing and widening the valves of the first streams 76. Specifically, the controller 70 adjusts the valves corresponding to the outer nozzles to extrude a greater volume of first food product when the center nozzle is closed, and the controller 70 adjusts the valves of the outer nozzles to extrude a lesser volume of the first food product when the center nozzle is open.

Figure 5B:
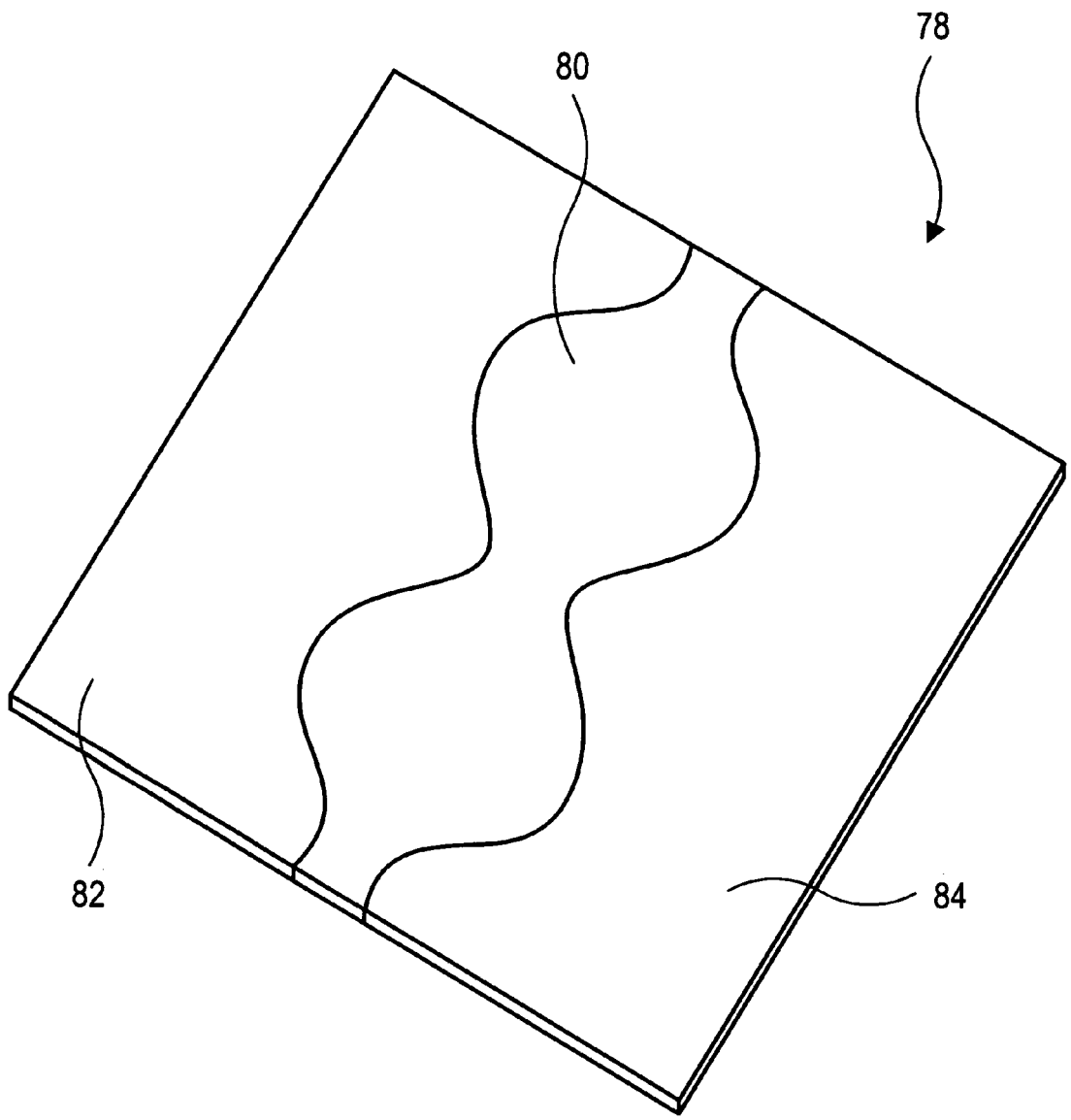
FIG. 5b is an isometric view of a food product produced by an alternative embodiment of the multi-colored and multi-flavored food product apparatus.

FIG. 5b illustrates another food product 78 produced with dynamic valve adjustments. To produce the final food product 78 illustrated in FIG. 5b, two nozzles extruding a first color and/or flavor streams 82 and 84 surround a single nozzle extruding a second color and/or flavor stream 80. The controller 70 narrows and widens the valve of the second color and/or flavor stream 80 in tandem with widening and narrowing the valves of the first streams 82 and 84. Specifically, the controller 70 adjusts the valves corresponding to the outer nozzles to extrude a greater volume of first food product when the center nozzle is narrowed, and the controller 70 adjusts the valves of the outer nozzles to extrude a lesser volume of the first food product when the center nozzle is widened.

Figure 6:
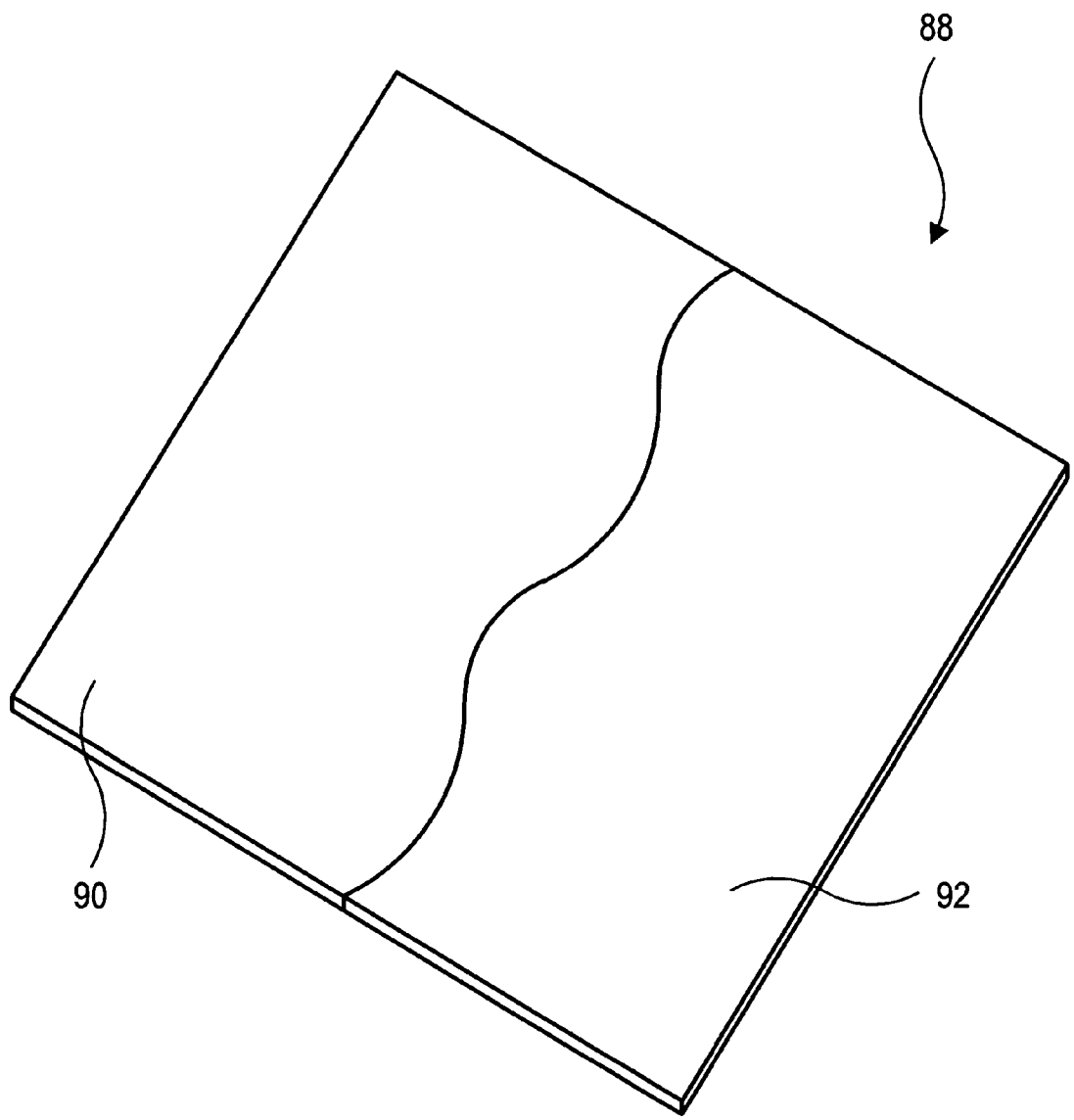

To produce additional variations to the design pattern of the food product, the apparatus 10 of the present invention can be mounted on a mechanical device 86. The mechanical device 86 holds the extruding nozzles 28 and 30 stationary or moves them laterally following a back and forth or a pendulum type motion. For example, the mechanical device moving the nozzles 28 and 30 laterally with a pendulum type motion produces the final food product 88 illustrated in FIG. 6 with the squiggle or swirling bands 90 and 92. The rate of motion may be varied to control the frequency of the squiggle bands 90 and 92. As known to one of ordinary skill in the art, the controller 70 may also be programmed to control the motion of the nozzles 28 and 30.

The apparatus 10 and method of the present invention that continuously manufactures a multi-colored and/or multi-flavored food product is ideal for the manufacture of ice cream novelties, gelatin novelties, individual cheese slices, individual meat slices, margarine, peanut butter, jelly and may other food products. The consuming public enjoys these food products having distinct patterns or designs. Additionally, these food products are efficiently continuously manufactured in their liquid state later being solidified for packaging and sale to consumers.

DESCRIPTION OF ILLUSTRATIVE EMBODIMENTS

The method and apparatus for continuous manufacture of a multi-colored and/or multi-flavored food product of the present invention is ideal for the continuous manufacture of multi-colored and/or multi-flavored individual process cheese slices. As known in the art, process cheese products are prepared by forming a particular blend of one or more comminuted natural cheeses, to which may be added various additives such as whey, condiments and/or emulsifying salts. The particular blend of cheese and additives is heated, melted and mixed to form a homogenous molten mass. One method and apparatus for manufacturing process cheese is described in U.S. Pat. No. 4,112,131, assigned to the assignee of the present invention and incorporated herein by reference. The molten process cheese is then cooled and solidified for packaging into individual cheese slices using a single-slice process cheese apparatus known in the art.

One contemporary single-slice process cheese apparatus that may be transformed into an apparatus for continuous manufacture of multi-colored and/or multi-flavored cheese slices is the hot pack single-slice packaging apparatus. FIG. 7 illustrates the one embodiment of the present invention of the hot pack apparatus 110 incorporating the apparatus described above. A convention single color and/or flavor hot pack apparatus may be transformed into the multi-color and/or multi-flavor hot pack apparatus by replacing its single surge tank, single positive metering pump and single extruding nozzle with a plurality of surge tanks, a plurality of metering pumps and a plurality of extruding nozzles as depicted in FIG. 7.

A molten process cheese of a first color and/or flavor is temporarily stored within a first surge tank 112, and a molten process cheese of a second color and/or flavor is temporarily stored within a second surge tank 114. The molten process cheese has a density range of approximately 8.5 to 9.5 pounds per gallon. The viscosity of the process cheese is less than or equal to a maximum pumpable viscosity typically having a range of about 4 poise to about 300 poise.

A pair of positive metering pumps 116 and 118 communicate the first molten cheese and the second molten cheese through tubes 120 and 122 respectively. The metering pumps 116 and 118 discharge the first and second molten cheese products at a precisely controlled rate to a first feeder tube 124 and to a second feeder tube 126 respectively. In one embodiment, the metering pumps 116 and 118 may be Waukesha size 15 feed pumps having a pumping capacity of approximately 0.133 gallons per revolution and an operating speed of approximately between 20 and 40 revolutions per minute resulting in pumping approximately between 0.25 to 0.5 gallons per minute. Automatic or operator control may vary the pumped output of the positive metering pumps 116 and 118. For automatic control, a suitable controller as known to one of ordinary skill in the art may control the metering pumps 116 and 118. In addition to controlling the metering pumps, the controller may sense and coordinate the operation of the various components of the hot pack system.

The first feeder tube 124 transmits the first molten cheese into three extruding nozzles 128, 130 and 132 as shown in FIGS. 8a & 8b. FIGS. 8a & 8b illustrate a close up view of the multi-color and/or multi-flavor extrusion apparatus incorporated into the hot pack apparatus 110. The second feeder tube 126 transmits the second molten cheese into two extruding nozzles 134 and 136. In one embodiment, the nozzles 128, 130, 132, 134 and 136 each may have an inner diameter of approximately 0.25 inches with approximately 0.25 inches separating adjacent nozzles. Each of the nozzles 128, 130, 132, 134 and 136 have valves 138, 140, 142, 144 and 146 respectively that control the flow rate of the cheese product into the nozzles. These valves may be under automatic or operator control to coordinate the width of the bands in the final cheese slice. As described above, the valves may be adjusted to provide wider and narrower bands of cheese.

The nozzles 128, 130 and 132 discharge the first liquid cheese product and the nozzles 134 and 136 discharge the second liquid cheese product as streams of the molten cheese product into a film forming station 148 (see FIG. 7) of a conventional single slice inner wrap and over wrap packaging system such as described in U.S. Pat. No. 4,586,317, assigned to the assignee of the present invention and incorporated herein by reference. The film forming station 148 comprises a film dispensing apparatus 150 for a continuous roll of transparent or semi-transparent, heat sealable wrapping material 152. The film forming station 148 continuously forms the wrapping material 152 into a tube 154. Specifically, the wrapping material 152 is overlapped (or longitudinally sealed) to form a continuous film tube 154 of substantially constant diameter. In one embodiment, the film tube 154 has a diameter of approximately three inches to accommodate the five nozzles.

The extrusion nozzles 128, 130, 132, 134 and 136 discharge their separate streams of molten cheese product into the film tube 154. The temperature of the molten cheese may be approximately between 140° F. and 180° F. The rate of introduction of the molten cheese product into the film tube 154 is coordinated with the forward motion of the film tube 154 to provide steady state operation of the system. The forward motion of the tube may range between approximately 2 to 7 inches per second depending on the surface speed of cooling wheels 162, 164 and 166.

The extruded streams have a height and a width with respect to the film tube 154. Once the streams contact the film tube 154, they move longitudinally away from the nozzles 128, 130, 132, 134 and 136 in the direction of the arrow. As the streams move longitudinally within the tube 154, the streams spread out laterally within the film tube 154 due to the force of gravity such that the width of each stream increases while the height of each stream decreases.

Once the streams are extruded from their respective nozzles 128, 130, 132, 134 and 136, ambient air surrounding the film forming station 148 convection cools the streams of molten cheese product. In addition to ambient cooling, other cooling means as disclosed above may be used on the hot pack apparatus 110. The ambient cooling reduces the temperature of the extruded streams increasing the viscosity of each stream because the temperature of the surrounding air is less than the temperature of the extruded cheese streams. When the lateral spreading of the one of the extruded streams abuts the lateral spreading of the adjacent stream, the two streams of different color and/or flavor do not substantially mix because their viscosities are equal to or greater than a minimum inhibit substantial mixing viscosity which inhibits the streams from substantially mixing. After the five extruded streams abut, they join into a single stream and continue moving away from the nozzles 128, 130, 132, 134 and 136 within the tube 154.

For continuous operation of the hot pack apparatus 110 to produce the multi-colored and/or multi-flavored cheese slices, the viscosity of the streams may vary within apparatus 110. When the streams are within the tubes 120 and 122 and within the nozzles 128, 130, 132, 134 and 136, the viscosity of the streams may be less than or equal to the maximum pumpable viscosity. The maximum pumpable viscosity is a viscosity that allows a continuous stream of molten cheese product to pass through the tubes 120 and 122 and out of the nozzles 128, 130, 132, 134 and 136. When the lateral spread of one of the streams abuts the lateral spread of the adjacent stream, the viscosities of the streams may be greater than or equal to a minimum inhibit substantial mixing viscosity. The minimum inhibit substantial mixing viscosity is a viscosity that inhibits the lateral spread of one stream from substantially mixing with the lateral spread of the adjacent stream when the streams meet to form a single stream.

To provide a cheese product with a desired uniform thickness and to ensure that the extruded streams have merged, sizing rolls 156, 158 and 160 flatten the longitudinally sealed film tube 154 and enclosed heat settable molten cheese product. The first sizing roll 156 is relatively close to the nozzles 128, 130, 132, 134 and 136. In one embodiment, the first sizing roll 156 is approximately one inch from the nozzles 128, 130, 132, 134 and 136. When the extruded streams reach the first sizing roll 156, the viscosities of the streams must be large enough to inhibit substantial mixing of adjacent streams of different color and/or flavor. The sizing rolls 158 and 160 flatten the cheese streams to provide the desired thickness of the cheese slice is approximately ⅛ of an inch thick and may range from approximately ¹⁄₁₆ of an inch to approximately ³⁄₁₆ of an inch.

Three cooling wheels 162, 164 and 166 draw the flattened, substantially filled film tube 154 through the film forming station 148. The surface speed of the cooling wheels 162, 164 and 166 may range approximately between 2 and 7 inches per second. The wheels 160, 162 and 164 are relatively large and uniformly heat conduction cool the cheese tube 154 to a temperature of approximately 55–75° F. A refrigerant circulated within the cooling wheel structure may further chill the cooling wheels 162, 164, and 166 to a temperature in the range of approximately 40° F. to approximately 60° F. At about 70° F. or less, the multi-colored and/or multi-flavored cheese slices are more easily stacked and overwrapped by packaging equipment, and accordingly, it is desirable to cool the cheese tube 154 to such lower temperatures on the cooling wheels 162, 164 and 166, or by subsequent cooling.

The cooled, wrapped multi-colored and/or multi-flavored cheese product may be conducted to a sealing apparatus 168 such as described in U.S. Pat. No. 4,586,317, which is incorporated herein by reference. The sealing apparatus comprises two opposing arrays of sealing elements and voiding elements, respectively arranged and interconnected in the form of belts which may be driven in registration at relatively high speed. The sealing apparatus 168 provides cross seals on the longitudinal cheese tube 154 in order to provide individually wrapped multi-colored and/or multi-flavored cheese slices. The sealing apparatus may provide a cheese slice that is approximately 3.625 inches long and may produce about sixteen slices per revolution. The sealing apparatus 168 may operate at a speed to produce about 50 to 70 slices per minute. Any sealing apparatus known in the art may be used to provide cross seals on the cheese tube 154.

The cooled slices are subsequently conducted to a transverse cutting and packaging station 170 which may be of conventional design. At the station 170, the film tube is transversely cut at approximately the center of the cross seals to provide individual packages. The entire apparatus and its corresponding cutting station may be operated continuously at relatively high speed to provide flat, undistorted individually wrapped slices with package cross seals of desirable uniform strength and integrity and having excellent bacteriological stability. Any cutting and packaging station known in the art may be used to transversely cut the cross seals and to package the individual multi-colored and/or multi-flavored cheese slices.

For packaging the individual slices, the slices may be stacked in layers of about 3 to about 25 or more slices. A substantially gas impermeable, substantially light impermeable packaging material preferably overwraps the stacked slices. The packaging material forms a substantially hermetically sealed package around the individual slices. Other alternative packaging materials and packaging methods known by one skilled in the art may be used to overwrap the stacked slices. The sealed, overwrapped package provides the consumer with a sealed unit containing a plurality of individually wrapped slices.

An operating example of one embodiment of the multi-color and/or multi-flavor hot pack apparatus 10 will now be described. To produce multi-color and/or multi-flavor cheese slices, a molten process cheese having a moisture content of about 43%, a density of about 9 pounds per gallon, and a temperature of about 162° F. is communicated through the tubes 120 and 122 to nozzles 128, 130, 132, 134 and 136. The air temperature surrounding the hot pack machine 10 is approximate 64° F. The nozzles 128, 130, 132, 134 and 136 each have an inner diameter of approximately 5/16 inches with approximately 5/16 inches separating adjacent nozzles. The nozzles 128, 130, 132, 134 and 136, which are approximately 1.75 inch from the first sizing roll 156, discharge their cheese streams into the film tube 154. The film tube is approximately 3 inches wide and approximately 7/16 inch high.

The film tube 154 has a forward speed of about 6.3 inches per second, and the nozzles 128, 130, 132, 134 and 136 each discharge their cheese streams at about 0.36 gallons per minute. The viscosity of each of the cheese streams is approximately 250 poise when the streams abut. The sizing rolls 156, 158 and 160 flatten the substantially cheese filled tube 154 to a thickness of about 1/8 inch. The cooling wheels 162, 164 and 166 draw the flattened tube 154 over their surfaces to chill the cheese to about 65° F. prior to entering the sealing apparatus 168. The sealing apparatus 168 and the traverse cutting and packaging station 170 operate to provide approximately 70 slices per minute.

Figure 9:
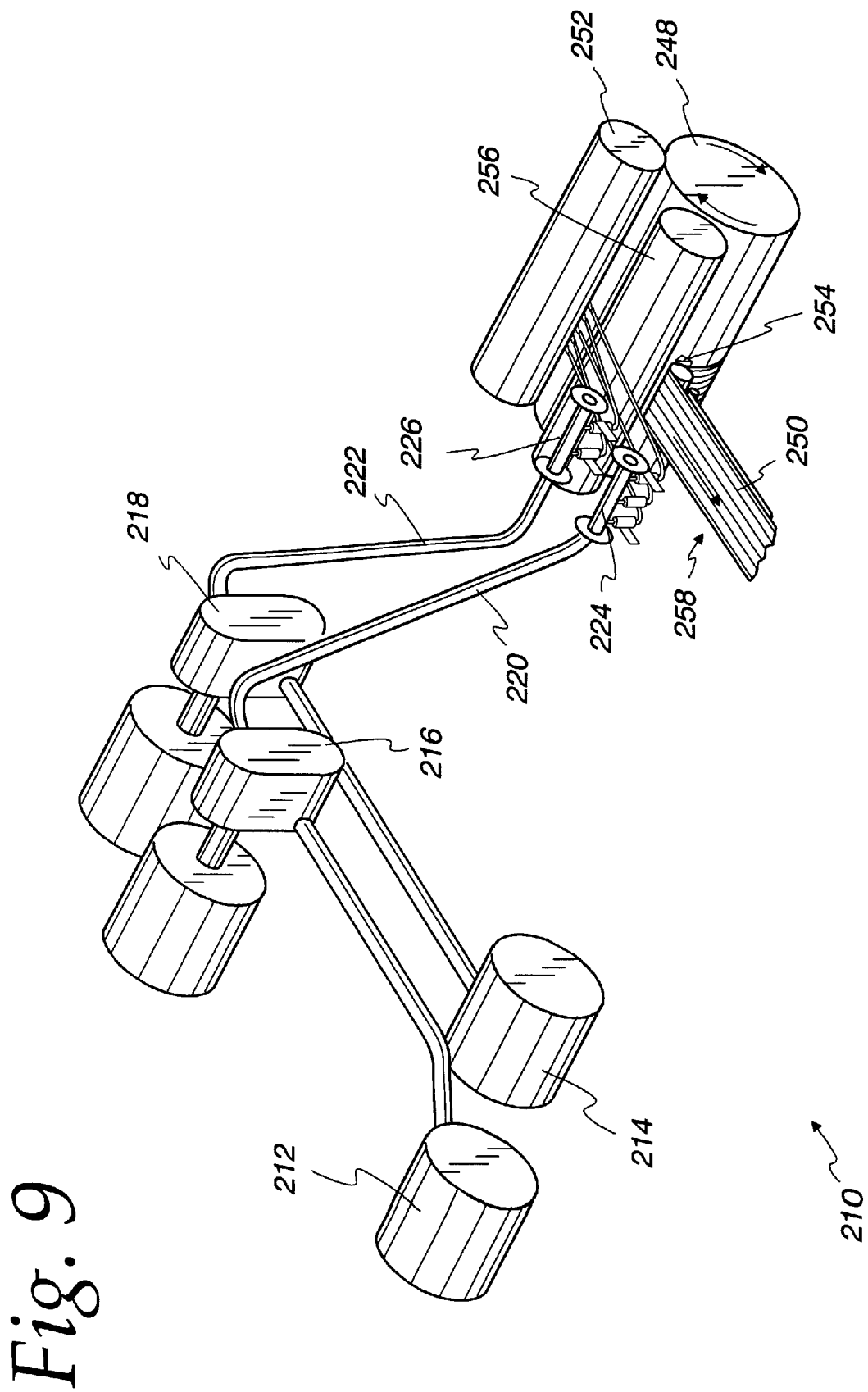
FIG. 9 is an isometric view of a chill roll single slice cheese apparatus incorporating the multi-colored and/or multi-flavored food product apparatus of the present invention.

Another contemporary single-slice process cheese apparatus which may be transformed into an apparatus for continuous manufacture of multi-colored and/or multi-flavored cheese slices is the chill roll single-slice apparatus. FIG. 10 illustrates the chill roll apparatus 210 incorporating the multi-color and/or multi-flavor apparatus described above. A conventional single color and/or single flavor chill roll apparatus may be transformed into the multi-color and/or multi-flavor chill roll apparatus by replacing its single surge tank, single positive metering pumps, and single extruding nozzle with a plurality of surge tanks, a plurality of positive metering pumps, and a plurality of extruding nozzles as depicted in FIG. 9.

A first surge tank 212 temporarily stores a molten process cheese of a first color and/or flavor, and a second surge tank 214 temporarily stores a molten process cheese of a second color and/or flavor. The molten process cheese has a density range of approximately 8.5 to 9.5 pounds per gallon. The viscosity of the process cheese is less than or equal to a maximum pumpable viscosity typically having a range of about 4 poise to about 300 poise.

A pair of positive metering pumps 216 and 218 communicate the first molten cheese and the second molten cheese through tubes 220 and 222 respectively. The metering pumps 216 and 218 discharge the first and second molten cheese products at a precisely controlled rate to a first feeder tube 224 and to a second feeder tube 226 respectively. In one embodiment, the metering pumps 216 and 218 may be Waukesha size 15 feed pumps having a pumping capacity of approximately 0.133 gallons per revolution and an operating speed of approximately between 20 and 40 revolutions per minute resulting in pumping approximately between 0.25 to 0.5 gallons per minute. Automatic or operator control may control the pumped output of the positive metering pumps 216 and 218. For automatic control, a suitable controller as known to one of ordinary skill in the art may sense and coordinate the operation of the various components of the system.

Figure 10A:
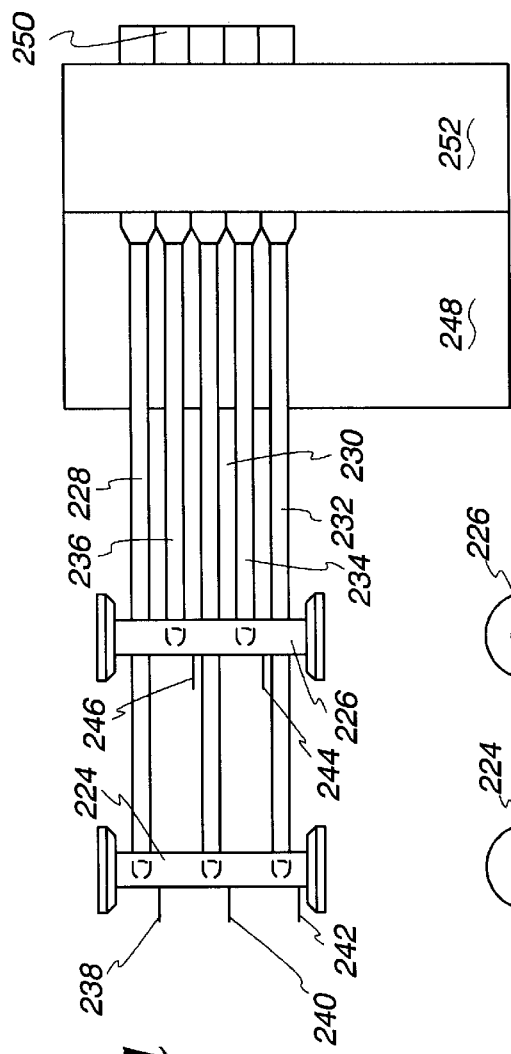
FIG. 10a is a top view of the multi-colored and/or multi-flavored food product apparatus of FIG. 9.
Figure 10B:
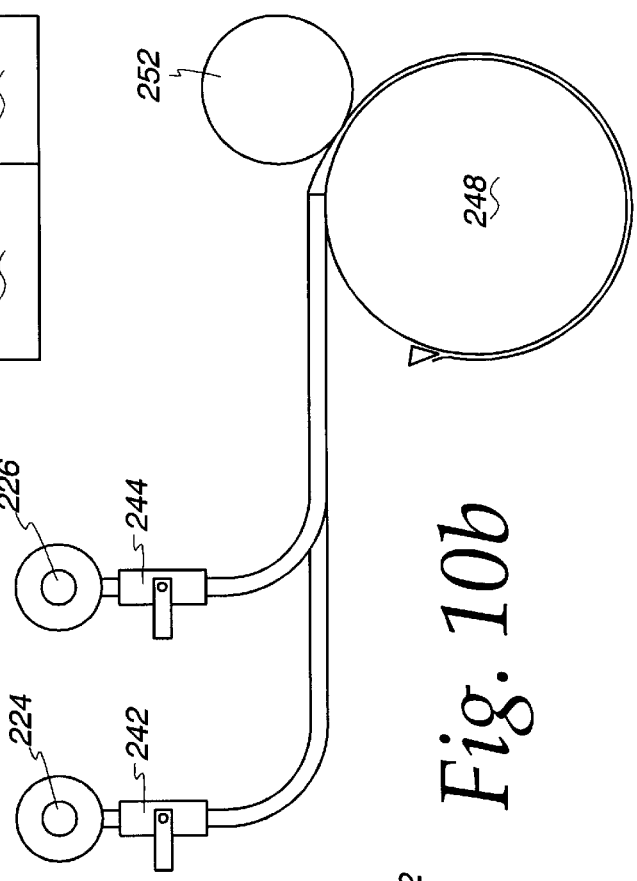
FIG. 10b is a front view of the multi-colored and/or multi-flavored food product apparatus of FIG. 9.
Figure 11:
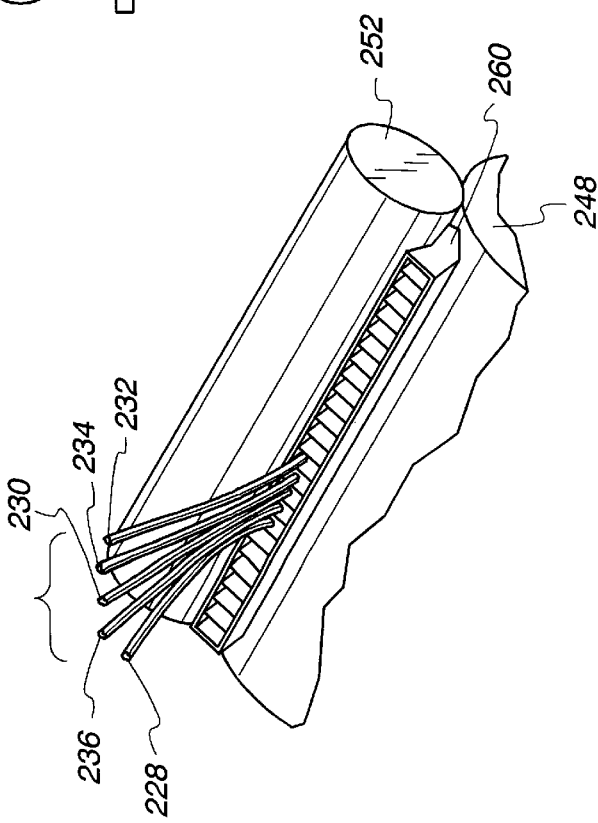
FIG. 11 is an isometric view of a hopper for use on the chill roll apparatus of FIG. 9.

The first feeder tube 224 transmits the first molten cheese into three extruding nozzles 228, 230 and 232 as shown in FIGS. 10a & 10b. FIGS. 10a & 10b illustrate a close up view of the extrusion apparatus incorporated into the chill roll apparatus 210. The second feeder tube 226 transmits the second molten cheese into two extruding nozzles 234 and 236. In one embodiment, the nozzles 228, 230, 232, 234 and 236 each may have an inner diameter of approximately 0.25 inches with approximately 0.25 inches separating adjacent nozzles. Each of the nozzles 228, 230, 232, 234 and 236 have valves 238, 240, 242, 244 and 246 respectively that control the flow rate of the cheese product into their nozzles. These valves may be under automatic or operator control to coordinate the appearance of the final cheese slice. As described above, the valves may be adjusted to provide wider and narrower bands of cheese.

As illustrated in FIGS. 9, 10a and 10b, the nozzles 228, 230 and 232 discharge the first molten cheese product and the nozzles 234 and 236 discharge the second molten cheese product as streams of the molten cheese product onto a chill roll 248 of a conventional chill roll apparatus such as described in U.S. Pat. No. 3,887,719 which is incorporated by reference herein. In one embodiment, the hopper of the conventional chill roll apparatus may be removed to allow the nozzles 228, 230, 232, 234 and 236 to discharge the molten cheese product directly onto the chill roll 248. In another embodiment illustrated in FIG. 11, the nozzles 228, 230, 232, 234 and 236 may discharge the molten cheese product into a partitioned hopper 260. In a further embodiment, the conventional unpartitioned hopper may be left on the convention chill roll apparatus with the nozzles 228, 230, 232, 234 and 236 positioned at the tip within the unpartitioned hopper to discharge the molten cheese product onto the chill roll 248. The illustrated embodiment in FIGS. 9, 10a, 10b and 11 show five nozzles 228, 230, 232, 234 and 236; however, in other embodiments additional nozzles may be added to discharge the molten cheese product across the length of the chill roll 248.

The chill roll 248 has refrigerated coolant circulating beneath the surface of the chill roll 248 to cool the surface of the chill roll 248. The chill roll 248 is a relatively large, chilled cylindrical roll that continuously rotates. In one embodiment, the chill roll 248 may have a diameter of approximately five feet and a surface speed that may range from approximately one to five inches per second.

Upon contacting the surface of the chill roll 248, the streams of cheese product adhere to the roll 248 and move with the roll 248 away from the nozzles 228, 230, 232, 234 and 236. Each of the cheese product streams have a height and a width with respect to the chill roll 248. The temperature of the extruded molten cheese product may be approximately between 140° F. and 180° F. As the streams move with the roll 248, they spread out laterally due to the force of gravity such that the width of each stream increases while the height of each stream decreases. Because the roll 248 is chilled and because of ambient cooling from the surrounding air which has a lower temperature than the cheese, the molten cheese streams begin to cool on the chill roll 248 increasing the viscosity of each stream. In addition to cooling with the chill roll 248 and ambient cooling, other cooling means as disclosed above may be used on the chill roll apparatus 210. When the lateral spreading of one of the extruded streams abuts the lateral spreading of an adjacent stream, the two stream of different color and/or flavor do not substantially mix because their viscosities are equal to or greater than a minimum inhibit substantial mixing viscosity which inhibits the streams from substantially mixing. After the five streams abut, they join into a continuous sheet of multicolored and multi-flavored cheese product 250.

For continuous operation of the chill roll apparatus 210 to produce the multi-colored and/or multi-flavored cheese slices, the viscosity of the streams may vary within apparatus 210. When the streams are within the tubes 220 and 222 and within the nozzles 228, 230, 232, 234 and 236, the viscosity of the streams may be less than or equal to the maximum pumpable viscosity. The maximum pumpable viscosity is a viscosity that allows a continuous stream of molten cheese product to pass through the tubes 220 and 222 and out of the nozzles 228, 230, 232, 234 and 236. When the lateral spread of one of the streams abuts the lateral spread of the adjacent stream, the viscosities of the streams may be greater than or equal to the minimum inhibit substantial mixing viscosity. The minimum inhibit substantial mixing viscosity is a viscosity that inhibits the lateral spread of one stream from substantially mixing with the lateral spread of the adjacent stream when the streams meet to form a single stream.

The multi-colored and multi-flavored cheese sheet 250 further cools and begins to solidify as it clings to the roll 248. The multi-colored and/or multi-flavored cheese sheet 250 remaining in engagement with the chill roll 248 around a substantial portion of the circumference of the roll. The cheese sheet 250 solidifies in a period of time somewhat less than the one complete revolution of the roll. As illustrated in FIG. 10, the streams of cheese product contact the cheese roll at the upper quadrant of the chill roll 248, and the solidified cheese sheet 248 separates from the roll 248 before the roll 248 returns to the position where the liquid cheese streams hit the roll 248.

As the multi-colored and/or multi-flavored cheese sheet 250 rotates on the roll 248 and while still soft, it passes under a flattening roll 252 to provide a cheese product with a desired uniform thickness. The desired thickness is approximately 1/8 of an inch thick with general ranges from approximately 1/16 of an inch to approximately 3/16 of an inch. Not only does the flattening roll 252 compress the cheese sheet to the uniform thickness or height, but it also ensures that all of the adjacent streams have merged into the continuous multi-colored and/or multi-flavored cheese sheet 250.

To remove the solidified multi-colored and/or multi-flavored cheese sheet 250 from the chill roll 248, a doctor blade 254 extends along the length of the roll 248. The doctor blade 254 removes the cheese sheet 250 from the surface of the chill roll 248 before the point where the cheese streams are introduced to the roll 248. Additionally, the doctor roll 254 clears the surface of the chill roll 248 for receipt of additional liquid cheese streams.

The separated cheese sheet 250 feeds into a nip between a guide roll 256 and a take-off conveyor 258. The guide roll 256 rotates along with the moving conveyor 258 to remove the cheese sheet 250 from the chill roll 248. The take-off conveyor 258 transports the flexible cheese sheet 250 in a direction away from the chill roll 248 at the same speed at which the chill roll 248 rotates. In one embodiment, the take-off conveyor 258 may have a range of speed of approximately one to five inches per second. The multi-colored and/or multi-flavored cheese sheet 250 is transported to be divided into individual slices for packaging.

An apparatus and method for dividing the cheese sheet 250 into individual slices is described in U.S. Pat. Nos. 3,479,024 and 3,887,719 which are assigned to the assignee of the present invention and incorporated herein by reference. The cheese sheet 250 may be divided to create cheese slices having a length of approximately 3.5 inches and a width of approximately 3 inches. For the illustrated embodiment that provides a one lane cheese sheet 250 with a width of approximately 3 inches, the number of cheese slices produced may range from approximately 17 to 85 slices per minute. For an embodiment that provides a four lane cheese sheet with a width of approximately 12 inches, i.e., four slices by longitudinally dividing the cheese sheet, the number of cheese slices produced may range from approximately 68 to 340 slices per minute. For an embodiment that provides a eight lane cheese sheet with a width of approximately 24 inches, i.e., eight slices by longitudinally dividing the cheese sheet, the number of cheese slices produced may range from approximately 136 to 680 slices per minute. The individual cheese slices may then be packaged for sale to consumer as known to one of ordinary skill in the art.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. An apparatus for manufacturing, on a moving platform, a food product having a plurality of sections having different characteristics, said apparatus comprising:

a moving platform;

a first non-rotatable nozzle positionable relative to said platform, for extruding a first stream of a first liquid food product having a first characteristic onto said platform, said first stream having a height and a width with respect to said platform, said first nozzle being constructed and positionable relative to said platform so as to cause said first stream, under the influence of gravity, to spread out on the platform such that said height decreases and said width increases; and a second non-rotatable nozzle adjacent to said first nozzle and positionable relative to said first nozzle and to said platform, for extruding a second stream of a second liquid food product having a second characteristic on to said platform adjacent and separate from said first stream, said second stream having a height and a width with respect to said platform, and said second nozzle being constructed and positionable relative to said platform and relative to said first nozzle so as to cause said second stream, under the influence of gravity, to spread out on the platform such that said height decreases and said width increases, and such that said increasing width of said first stream abuts said increasing width of said second stream on the platform, and wherein a first viscosity of said first stream and a second viscosity of said second stream inhibit substantial mixing of said first stream with said second stream.

2. The apparatus of claim 1 wherein said first viscosity and said second viscosity are between a range of a maximum pumpable viscosity and a minimum inhibit substantial mixing viscosity to inhibit substantial mixing of said first stream and said second stream when said increasing width of said first stream abuts said increasing width of said second stream.

3. The apparatus of claim 1 wherein said sections having different characteristics includes different color.

4. The apparatus of claim 1 wherein said sections having different characteristics includes different flavor.

5. The apparatus of claim 1 further including a cooling means for cooling and increasing the viscosities of said first stream and second stream so that when said increasing width of said first stream abuts said increasing width of said second stream said first viscosity and said second viscosity inhibit substantial mixing of the said first stream with said second stream.

6. The apparatus of claim 1 further comprising a stream joiner for ensuring that the first stream and the second stream join to form a single product stream.

7. The apparatus of claim 6 wherein said stream joiner includes a sizing roll.

8. The apparatus of claim 1 further comprising a flattener for compressing said first stream and said second stream into a uniform thickness.

9. The apparatus of claim 5 wherein said cooling means includes a chill roll.

10. The apparatus of claim 5 wherein said cooling means includes a cooling fluid.

11. The apparatus of claim 5 wherein said cooling means includes an ambient cooling.

12. The apparatus of claim 1 wherein said platform includes a chill roll.

13. The apparatus of claim 1 wherein said platform includes a web of packaging.

14. The apparatus of claim 1 further comprising:

a controller for controlling the rate of extruding said first stream to thereby control the shapes and positions of the portions of said food product defined by said first food product and said second food product, respectively.

15. The apparatus of claim 14 including a first valve connected to said first nozzle and responsive to said controller for controlling said rate of extruding said first stream.

16. The apparatus of claim 1 further comprising:

a mechanical device selectably operable for moving said first nozzle and said second nozzle laterally relative to a direction of movement of said platform.

17. The apparatus of claim 16 further comprising:

a controller for controlling said mechanical device for moving said first nozzle and said second nozzle.

18. An apparatus for manufacturing a food product having a plurality of sections having different characteristics, said apparatus comprising:

a platform moving in a predetermined direction;

a first nozzle adjacent to said platform, for extruding a first stream of a first liquid food product having a first characteristic onto said platform, said first stream being extruded in a direction generally in the same said direction of the movement of said platform; said first stream having a height and a width with respect to said platform, and said first nozzle being constructed and positionable relative to said platform so as to cause said first stream, under the influence of gravity, to spread out under the force of gravity such that said height decreases and said width increases;

a second nozzle adjacent to said first nozzle and to said platform, for extruding a second stream of a second liquid food product having a second characteristic on to said platform adjacent to said first stream, said second stream being extruded in a direction generally in the same said direction of the movement of said platform, said second stream having a height and a width with respect to said platform, and said second nozzle being constructed and positionable relative to said platform and relative to said first nozzle so as to cause said second stream, under the influence of gravity to spread out such that said height decreases and said width increases; and a stream joiner constructed and disposed relative to said platform and said first and second nozzles for abutting said increasing width of said first stream with said increasing width of said second stream to form a single product stream, a first viscosity of said first stream and a second viscosity of said second stream inhibiting substantial mixing of said first stream with said second stream when abutted by said stream joiner.

19. An improved hot pack single-slice packaging apparatus for manufacturing cheese slices having a plurality of sections having different characteristics, said hot pack apparatus of the type with a film dispensing station forming a tube of packaging film, and a series of cooling wheels pulling said tube in a longitudinal direction, wherein the improvement comprises:

a first nozzle adjacent to said tube, for extruding a first stream of a first liquid cheese product having a first characteristic into said tube, said first nozzle and said tube being constructed and disposed in such a manner that said first stream spreads out in a lateral direction within said tube as said tube is pulled in a lateral direction; and a second nozzle adjacent to said tube, said second nozzle capable of extruding a second stream of a second liquid food product having a second characteristic into said tube adjacent to said first stream, said second nozzle and said tube being constructed and disposed in such a manner that said second stream spreads out in a lateral direction within said tube, and such that said lateral spread of said first stream abuts said lateral spread of said second stream, a first viscosity of said first stream and a second viscosity of said second stream inhibiting substantial mixing of said first stream with said second stream within said tube.

20. The improvement of claim 19 wherein said first viscosity and said second viscosity are between a range of a maximum pumpable viscosity and a minimum inhibit substantial mixing viscosity to inhibit substantial mixing of said first stream with said second stream when said lateral spread of said first stream abuts said lateral spread of said second stream.

21. The improvement of claim 19 wherein said sections having different characteristics includes different color.

22. The improvement of claim 19 wherein said sections having different characteristics includes different flavor.

23. The improvement of claim 19 further comprising a cooling means for cooling said first stream and second stream so that when said lateral spread of said first stream abuts said lateral spread of said second stream to form a single product stream said first viscosity and said second viscosity inhibit substantial mixing of said first stream with said second stream.

24. The improvement of claim 23 wherein said cooling means includes an ambient cooling.

25. The improvement of claim 19 further comprising a stream joiner for abutting said lateral spread of said first steam and said lateral spread of said second stream to form a single product stream.

26. The improvement of claim 25 wherein said stream joiner includes a sizing roll.

27. The improvement of claim 19 further comprising flattener for flattening said first stream and said second stream into a uniform thickness.

28. The improvement of claim 19 further comprising:

a controller for controlling the rate of extruding said first stream.

29. The improvement of claim 28 wherein said controller includes a first valve on said first nozzle for controlling a rate of extruding said first stream.

30. The improvement of claim 19 further comprising:

a mechanical device capable of moving said first nozzle and said second nozzle, said first nozzle and said second nozzle being mounted on said mechanical device.

31. The apparatus of claim 30 further comprising:

a controller for controlling said mechanical device for moving said first nozzle and said second nozzle.

32. An improved chill roll single-slice packaging apparatus for manufacturing cheese slices having a plurality of sections having different characteristics, said chill roll apparatus of the type having a rotating cylindrical roll, wherein the improvement comprises:

a first nozzle adjacent to said roll, for extruding a first stream of a first liquid cheese product having a first characteristic onto said roll, said first stream having a height and a width with respect to said roll, said first nozzle and said roll being relatively disposed such that said first stream spreads out on said roll and such that said height decreases and said width increases as said roll rotates; and a second nozzle adjacent to said first nozzle and to said roll, for extruding a second stream of a second liquid cheese product having a second characteristic onto said roll adjacent to said first stream, said second stream having a height and a width with respect to said roll, said second nozzle, said first nozzle and said roll being relatively disposed such that said second stream spreads out on such roll and such that said height decreases and said width increases, and such that said increasing width of said first stream abuts said increasing width of said second stream as said roll rotates, a first viscosity of said first stream and a second viscosity of said second stream inhibiting substantial mixing of said first stream with said second, when abutted.

33. The improvement of claim 32 wherein said first viscosity and said second viscosity are between a range of a maximum pumpable viscosity and a minimum inhibit substantial mixing viscosity to inhibit substantial mixing of said first stream with said second stream when said increasing width of said first stream abuts said increasing width of said second stream.

34. The improvement of claim 32 wherein said sections having different characteristics includes different color.

35. The improvement of claim 32 wherein said sections having different characteristics includes different flavor.

36. The improvement of claim 32 further comprising a stream joiner for ensuring that the first steam and the second stream join to form a single product stream.

37. The improvement of claim 36 wherein said stream joiner includes a sizing roll.

38. The improvement of claim 32 further comprising flattener for compressing said first steam and said second stream into a uniform thickness.

39. The improvement of claim 32 further comprising:

a controller for controlling the rate of extruding said first stream to thereby control the shape and position of the section of said food product defined by said first food product relative to said second food product.

40. The improvement of claim 32 further comprising:

a mechanical device capable of moving said first and said second nozzle in a direction lateral to said rotation of said roll.

* * * * *

UNITED STATES PATENT AND TRADEMARK OFFICE
Certificate

Patent No. 6,199,346 B1                                                                 Patented: March 13, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Asma N. Ahad, Skokie, IL; Warren R. Zaug, Niles, IL; Kampat Sangern, Buffalo Grove, IL; Gary F. Smith, Highland Park, IL; Susan B. Findlay, Northfield, IL; and John McGeown, Chicago, IL.

Signed and Sealed this Thirtieth Day of December 2003.

RINALDI RADA
*Supervisory Patent Examiner*
*Art Unit 3721*